United States Patent Office 2,696,103
Patented Dec. 7, 1954

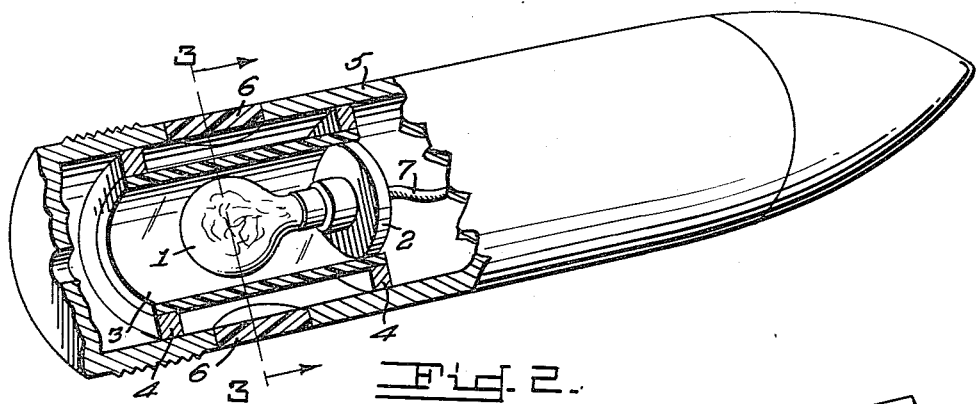
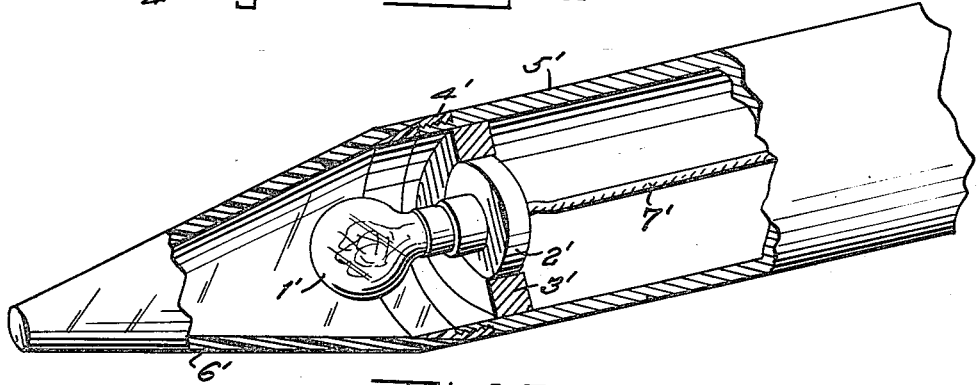
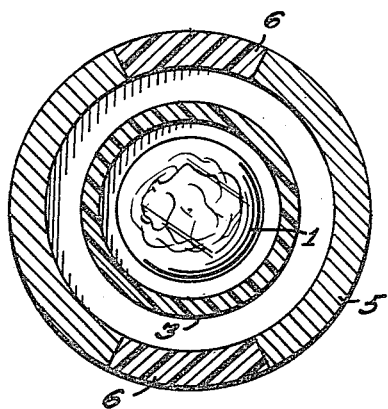
Inventors
Laurence B. Heilprin
Philip Krupen
George Nordquist

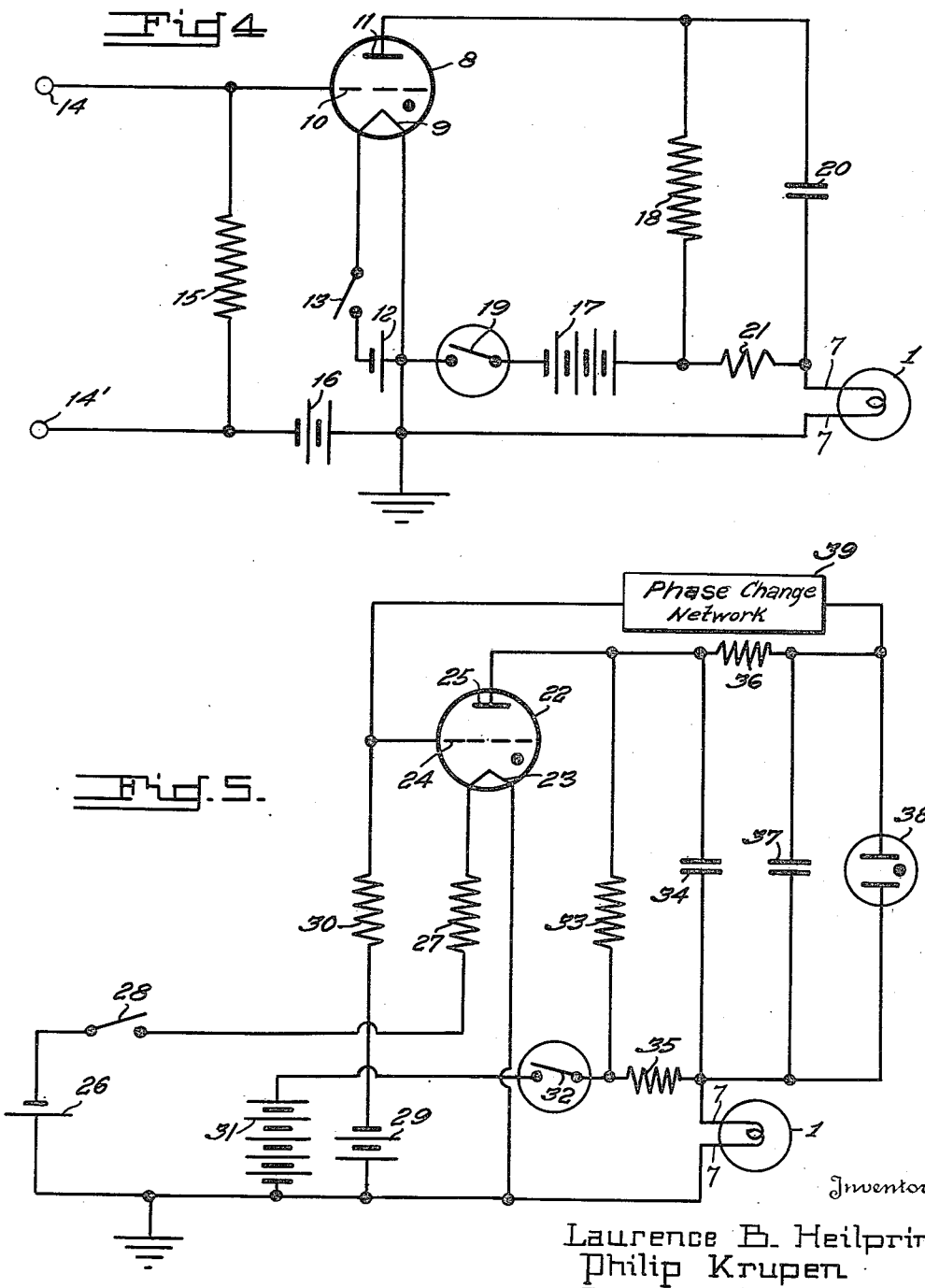

2,696,103

PHOTOFLASH INDICATOR OF AIR-BURST FUSE FUNCTION

Laurence B. Heilprin and Philip Krupen, Washington, D. C., and George Nordquist, Bethesda, Md., assignors to the United States of America as represented by the Secretary of the Army Application July 24, 1951, Serial No. 238,355

7 Claims. (Cl. 73—5)

(Granted under Title 35, U. S. Code (1952), sec. 266)

The invention described in the specification and claims may be manufactured and used by or for the Government for governmental purposes without the payment to us of any royalty thereon.

The present invention relates to a function indicator for various types of air-burst fuses wherein such fuses are mounted in appropriate shells or missiles in the normal manner, and wherein such fuses, which produce electrical, detonating pulses a predetermined time after launching, are used to set off the function indicator in accordance with the present invention so that an accurate visible indication of the functioning of such fuses is obtained.

It is an object of the present invention to provide a function indicator for various types of air-burst fuses.

It is another object of this invention to provide a function indicator for air-burst fuses which has a satisfactory flash.

It is another object of this invention to provide a function indicator for air-burst fuses which offers reliable operation with almost complete personnel safety.

It is a further object of this invention to provide a function indicator for air-burst fuse which has good photographic accuracy, and which satisfies power requirements, visibility and set-back effects.

Other objects of this invention will become apparent when taken in connection with the drawing which shows for purpose of illustration only several specific embodiments of this invention, and wherein:

Fig. 1 shows a perspective view, partly broken away, of one embodiment of a function indicator mounted in the base of a mortar shell in accordance with the present invention.

Fig. 2 shows a perspective view, partly broken away, of another embodiment of a function indicator mounted in the nose or ogive of a missile.

Fig. 3 shows a cross-sectional view taken along lines 3—3 of Fig. 1.

Fig. 4 shows one embodiment of an electrical trigger circuit for the function indicator.

Fig. 5 shows another embodiment of an electrical trigger circuit for the function indicator.

In the course of the development of air-burst fuses for missiles, a great need has arisen for accurate indication of function. The most obvious method, and the one in common practice, utilizes a detonator and an explosive charge activated by the fuse. For example, the explosion of a tetryl "puff" may be used as the indicator, or may in turn detonate a heavier charge of high explosive. In such cases the indication of function is both rapid and positive. However the use of an explosive indicator during the developmental stage of a fuse has certain safety disadvantages, such as the need for elaborate safety precautions and incorporation of added mechanical and electrical safety-arming devices. And in spite of all such safety precautions the risk to personnel or equipment can never be completely eliminated.

In order to overcome these disadvantages, a photoflash function indicator has been developed in accordance with the present invention which eliminates the use of explosives.

Referring more particularly to the drawing wherein like reference numerals are used to designate like parts in the various figures, a photoflash tube or bulb 1 is mounted in tube socket 2. One type of photoflash tube which has proved satisfactory in practice is the "SM" or "Speed Midget" type (size T–11), made by General Electric. A translucent or transparent protective cover 3 surrounds the socket 2 and photoflash bulb 1. Supporting rings 4 space and retain the protective cover 3 in the base of the mortar shell 5. Transparent or translucent windows 6 are provided in the base of mortar shell 5 to render visible the photoflash of the function indicator assembly. Leads 7 connect the photoflash tube 1 to the electric trigger circuit which will be more fully described in connection with Figs. 4 and 5.

Another embodiment of a photoflash function indicator is illustrated in Fig. 2 wherein photoflash tube 1' is mounted in tube socket 2' which is supported and kept in position by spacer ring 3'. An adapter 4' having a threaded portion is fastened to the threaded front end of missile 5'. A transparent or translucent nose or ogive 6' is fitted over the slanting portion of adapter 4' by means of a press fit. Leads 7' connect the photoflash tube 1' to the electric trigger circuit. The same type of photoflash tube "SM" size T–11 has been used successfully in the embodiment illustrated in Fig. 2.

The trigger circuit of Fig. 4 comprises a gas-filled thyratron tube 8 having a cathode 9, a control grid 10 and a plate 11. The thyratron tube shown herein is of the directly-heated type with one side of the filament connected to the grounded terminal of filament battery 12 and the other filament connected through switch 13 to the other terminal of battery 12. It is understood however that other types of thyratron tubes, such as indirectly-heated cathode types, may be used in the trigger circuit. The control grid 10 is connected to input terminal 14 and is also connected to ground through grid resistor 15 and bias battery 16. The other input terminal 14' is connected to the junction of grid resistor 15 and bias battery 16. The plate 11 of thyratron tube 8 is connected to the positive side of the plate supply battery 17 through plate resistor 18; the negative side of battery 17 is connected to ground through switch 19. A capacitor 20 in series with resistor 21 is connected across plate resistor 18. Photoflash tube 1 is connected to the trigger circuit by leads 7 which connect the photoflash tube 1 to ground and to the junction of capacitor 20 and resistor 21. The negative bias voltage 16 applied to control grid 10 through resistor 15 normally prevents firing of the thyratron tube 8 in the absence of a control signal.

The trigger circuit switches 13 and 19 are normally kept open in order to prevent voltages from batteries 2 and 17 from reaching the thyratron tube 8 thereby preventing premature firing of thyratron tube 8 and of photoflash bulb 1. In the operation switch 13 is closed before the missile is launched; switch 19, which is a mercury type switch stays open until after the missile is launched. Switch 19 is arranged in such a manner that during the acceleration period of the missile when it is launched, the mercury in switch 19 is urged into a part of the switch assembly which prevents closing of the switch. As soon as the missile travels in free air, the air drag will decelerate the missile, thereby urging the mercury into the opposite part of the switch assembly and consequently closing switch 19. It is thus seen that the mercury switch 19 acts as a safety arming device by delaying application of the plate power supply voltage 17 by a predetermined amount. As soon as switch 19 is closed, capacitor 20 will charge through resistor 18 and photo-flash tube 1. However this charging current is insufficient to operate the photo-flash bulb 1, since the maximum current is limited by the value of resistor 18, the resistance of photo-flash tube 1 being negligible in comparison thereto. The charging period of capacitor 20 is determined by the particular value of resistor 18 and capacitor 20. Resistor 21 has a twofold purpose, namely to keep capacitor 20 discharged before the launching of the missile and to discharge capacitor 20 if the trigger circuit is not actuated after capacitor 20 is charged. When signal is applied to thyratron tube 8 at any time after charging of capacitor 20, and of such magnitude as to overcome the bias voltage 16 and to cause thyratron tube 8 to fire, capacitor 20 discharges through photo-flash bulb 1, cathode 9 and anode 11, thereby causing firing of photo-flash tube 1. The resultant flash is clearly visible for more than a mile and may be photographed even in daylight. The signal applied to thyratron tube 8 may be either a positive pulse applied to terminal 14 or any equivalent signal. The generation of the signal may be in any conventional manner known in the prior art and forms no part of the present invention.

Typical fuses producing electrical detonating pulses with which the fuse function indicator of the present invention may be used are illustrated in the patents to M. G. Allison, entitled "Proximity Fuse," Patent No. 2,514,359; to M. Vos, entitled "Artillery Projectile," Patent No. 2,137,598; to H. C. Page, entitled "Arrangement for Producing a Triggering Effect in Proximity to an Object Adapted to Radiate Radiant-Wave Energy," Patent No. 2,441,030; to J. H. Hammond, Jr., entitled "Bomb Control System," Patent No. 2,411,788; and to W. A. Tolson, entitled "Sonic Proximity Fuse," Patent No. 2,536,327.

One set of typical values of the circuit parameters used with the trigger circuit of Fig. 4 are as follows:

Resistor 15 _____ megohms__ 3.3
Resistor 18 _____ do____ 0.47
Resistor 21 _____ do____ 4.7
Capacitor 20 _____ microfarads__ 5

It is understood however that the aforementioned values are only illustrative of one operating condition and other values may be assigned to the circuit parameters, depending on the amount of delay desired in a particular case.

The embodiment of Figure 5 illustrates a further modification of our fuse function indicator wherein the delayed signal referred to in the description of Figure 4 is generated by the trigger circuit within the fuse. The time of firing may be predetermined. More specifically thyratron tube 22 comprises a directly-heated cathode 23, control grid 24 and plate 25; however other types of thyratron tubes, such as tetrodes or indirectly-heated cathode types, are within the purview of this invention. One side of the directly heated cathode is connected to the grounded terminal of filament voltage supply battery 26, while the other side of the directly-heated cathode 23 is connected to the ungrounded terminal of battery 26 through current-limiting resistor 27 and switch 28. A negative voltage is applied to control grid 24 by means of bias battery 29 which has its negative terminal connected to control grid 24 through grid resistor 30 and its positive terminal connected to ground. The positive terminal of plate supply battery 31 is connected to plate 25 of thyratron tube 22 through mercury switch 32 and plate resistor 33. Capacitor 34 in series with resistor 35 are connected in parallel with resistor 33. Photoflash bulb 1 is connected to the trigger circuit by leads 7 which connect one side of photoflash bulb 1 to ground and the other side thereof to the junction of capacitor 34 and resistor 35. A time delay network consisting of resistor 36 and capacitor 37 is connected across capacitor 34; neon tube 38 is connected in parallel with capacitor 37, while a phase changing network 39 connects the control grid 24 to the junction of resistor 36 and capacitor 37.

In the operation of the self-triggering circuit illustrated in Fig. 5, switch 28 is closed before launching of the missile thereby applying filament voltage to thyratron tube 22. Mercury switch 32 is actuated by deceleration as described with respect to switch 19 of Fig. 4, thereby operating closure of switch 32 a predetermined time after launching of the missile. After closure of switch 32 capacitor 34 will begin to charge through resistor 33 and photoflash tube 1, this charging current being unable to operate tube 1 as pointed out with respect to Fig. 4. The time delay circuit consisting of elements 36 and 37 will apply a delayed voltage corresponding to the voltage rise at the plate 25 of thyratron tube 22 to neon tube 38. Neon tube 38 discharges after the plate 25 of thyratron tube 22 has reached a predetermined voltage thereby producing a trigger pulse which will overcome the bias voltage 29 applied to control grid 24 and fire thyratron tube 22. The trigger pulse or signal produced by discharge of neon tube 38 undergoes a phase change in phase changing network 39 in order to provide for proper polarity so as to oppose the negative bias developed by battery 29. Firing of thyratron tube 22 will discharge capacitor 34 through photoflash tube 1 thereby flashing tube 1.

The phase changing network 39 may be of any conventional type known in the prior art, such as an electron tube circuit, a transformer or the like.

One set of typical values for the circuit parameters used with the trigger circuit of Fig. 5 is given hereinafter; it is understood however that these values are merely illustrative of one operating conditions and other values may be used with the circuit.

Resistor 27 _____ ohms__ 2
Resistor 30 _____ megohms__ 3
Resistor 33 _____ kilohms__ 220
Resistor 35 _____ megohms__ 5
Resistor 36 _____ do____ 3.9
Capacitor 34 _____ microfarads__ 5.2
Capacitor 37 _____ do____ 0.6

While several specific embodiments of this invention have been described, the same are to be considered illustrative and not restrictive, and various modifications thereof which will readily suggest themselves to persons skilled in the art, are all considered to be within the broad scope of this invention as defined in the appended claims.

We claim:

1. A photoflash indicator of air-burst fuse function comprising a missile, a photoflash tube mounted in the base of said missile, an electronic trigger circuit flashing said tube a predetermined time after the launching of said missile, and means for rendering visible the flash of said tube, said last named means including translucent windows mounted in the base adjacent said tube.

2. The apparatus according to claim 1 wherein said last named means comprises a translucent ogive attached to the front end of said missile and wherein said tube is mounted within said ogive.

3. A photoflash indicator of air-burst fuse function comprising a missile, a photoflash tube mounted within said missile, concentric means for supporting and retaining said tube within said missile, and an electronic trigger circuit in said missile operative to flash said tube on a predetermined signal at any time after the launching of the missile, said trigger circuit comprising a grid-controlled gaseous discharge tube, electric storage means, power supply means, a first delay means operative in response to deceleration of said missile to connect said storage means to said power supply means, and means for discharging said storage means through said grid-controlled gaseous discharge tube and said photoflash tube upon firing of said thyratron tube in response to a further delayed signal.

4. A photoflash indicator of air-burst fuse function comprising a missile, a photoflash tube mounted within said missile, means for supporting said tube within said missile, and an electronic trigger circuit in said missile operative to flash said tube on a predetermined signal at any time after the launching of the missile, said trigger circuit comprising normally inoperative, grid-controlled, gaseous discharge tube, a capacitor, a power supply means, switch means operatively connecting said power supply means to said capacitor in response to deceleration of said missile, and means for applying a delayed pulse to said control grid to fire said gaseous discharge tube, said capacitor being discharged through said photoflash tube and said gaseous discharge tube upon the latter's firing, whereby said photoflash tube is operated.

5. The apparatus according to claim 4 wherein said switch means consists of a mercury switch inoperative during the acceleration of said missile and operative in response to deceleration thereof caused by the air-drag on said missile.

6. The apparatus according to claim 5 wherein said delayed pulse is generated by further circuit means independent of said trigger circuit.

7. The apparatus according to claim 5 wherein said means for applying a delayed pulse includes a delay circuit and a further gaseous discharge tube connected across said capacitor, said delay circuit and said further gaseous discharge tube producing a delayed pulse, and a phase changer connected between said further gaseous discharge tube and said control grid.

(References on following page)

References Cited in the file of this patent

UNITED STATES PATENTS

| Number | Name | Date |
|---|---|---|
| 1,776,796 | Ruhlemann | Sept. 30, 1930 |
| 1,841,983 | Ruhlemann | Jan. 19, 1932 |
| 1,875,985 | Brandt | Sept. 6, 1932 |
| 2,342,257 | Edgerton | Feb. 22, 1944 |
| 2,403,567 | Wales | July 9, 1946 |
| 2,404,553 | Wales | July 23, 1946 |
| 2,408,764 | Edgerton | Oct. 8, 1946 |
| 2,486,010 | Edgerton | Oct. 25, 1949 |
| 2,514,434 | Windes | July 11, 1950 |
| 2,553,436 | Brown et al. | May 15, 1951 |
| 2,603,970 | Metzler et al. | July 22, 1952 |